United States Patent [19]

Yagi

[11] Patent Number: 5,612,750
[45] Date of Patent: Mar. 18, 1997

[54] LINE CONTOUR ENHANCING CIRCUIT FOR USE WITH VIDEO SIGNALS

[75] Inventor: Yasuo Yagi, Tokyo, Japan

[73] Assignee: Pioneer Electronic Corporation, Saitama, Japan

[21] Appl. No.: 348,681

[22] Filed: Dec. 2, 1994

Related U.S. Application Data

[63] Continuation of Ser. No. 629,033, Dec. 19, 1990, abandoned, which is a continuation of Ser. No. 434,764, Nov. 13, 1989, abandoned.

[30] Foreign Application Priority Data

May 10, 1989 [JP] Japan ................... 1-1118137

[51] Int. Cl.⁶ .......................................... H04N 5/208
[52] U.S. Cl. ........................ 348/625; 348/252; 348/678
[58] Field of Search .......................... 348/571, 252, 348/625, 678, 691; H04N 5/208, 5/52, 5/57, 5/217, 5/21

[56] References Cited

U.S. PATENT DOCUMENTS

| | | | |
|---|---|---|---|
| 3,458,652 | 7/1969 | McMann, Jr. | 358/164 |
| 3,946,153 | 3/1976 | Peth et al. | 358/162 |
| 4,410,912 | 10/1983 | Hess et al. | 358/162 |
| 4,541,014 | 9/1985 | Yagi | 358/162 X |
| 4,797,745 | 1/1989 | Westell | 358/164 X |
| 4,843,472 | 6/1989 | Shinada | 358/164 |

FOREIGN PATENT DOCUMENTS

| | | | |
|---|---|---|---|
| 61-71772 | 4/1986 | Japan | H04N 5/208 |
| 61-152167 | 7/1986 | Japan | H04N 5/208 |
| 63-48969 | 3/1988 | Japan | H04N 5/208 |
| 63-209373 | 8/1988 | Japan | H04N 5/202 |
| 1-106590 | 4/1989 | Japan | H04N 5/52 |

*Primary Examiner*—Victor R. Kostak
*Assistant Examiner*—Nathan J. Flynn
*Attorney, Agent, or Firm*—Keck, Mahin & Cate

[57] ABSTRACT

A line contour enhancing circuit comprises a second order differentiation circuit for effecting a second order differentiation to a video signal and producing a second order differentiation signal, an adding circuit for adding the video signal and the second order differentiation signal, and a non-linear amplifier having a gain characteristic in which a differentiation gain increases gradually as the level of its input signal increases. The circuit features that the second order differentiation circuit receives the video signal output from the non-linear amplifier, thereby the line contour enhancing operation is effected depending on the level of the video signal. With this arrangement the degradation of the image produced by a low luminance level video signal due to the presence of noises is prevented.

12 Claims, 2 Drawing Sheets

LINE CONTOUR ENHANCING CIRCUIT FOR USE WITH VIDEO SIGNALS

This is a continuation of application Ser. No. 07/629,033, filed Dec. 19, 1990, now abandoned. which was a continuation of application Ser. No. 07/434,764 filed Nov. 13, 1989, now abandoned.

BACKGROUND OF THE INVENTION

1. Field of the Invention

The present invention relates to a line contour enhancement circuit for enhancing line contours of video images.

2. Description of Background Information

Line contour enhancing circuits are widely used for improving sharpness of television images. Conventionally, a method has been used in which a second order differentiation operation is effected to a video signal and the generated second order differentiation signal is added to the video signal.

On the other hand, if a dark scene is televised by a video camera, the S/N ratio of the video signal is generally degraded in dark portions of the image. Therefore, when a conventional line contour enhancing process is effected to a signal having a low luminance level, it increases noises in the reproduced image. So there has been a problem that picture quality is degraded.

OBJECT AND SUMMARY OF THE INVENTION

The object of the present invention is therefore to provide a line contour enhancing circuit capable of effecting a signal processing operation which is dependent on the luminance level of the input video signal.

In order to accomplish the above-mentioned object, the line contour enhancing circuit according to the present invention includes a second order differentiating circuit for effecting a second order differentiation of a video signal and generating a second order differentiation signal, an adding circuit for adding the second order differentiation signal on the video signal, wherein the circuit further includes a non-linear amplifier having a gain characteristic in which the differentiation gain gradually increases as the level of the input signal increases, and the video signal is supplied to the non-linear amplifier before being supplied to the second order differentiation circuit.

DETAILED DESCRIPTION OF A PREFERRED EMBODIMENT

Before entering into the explanation of the embodiment of the present invention, an example of conventional line contour enhancing circuits will be described with reference to FIGS. 1 through 3.

Figure 1:
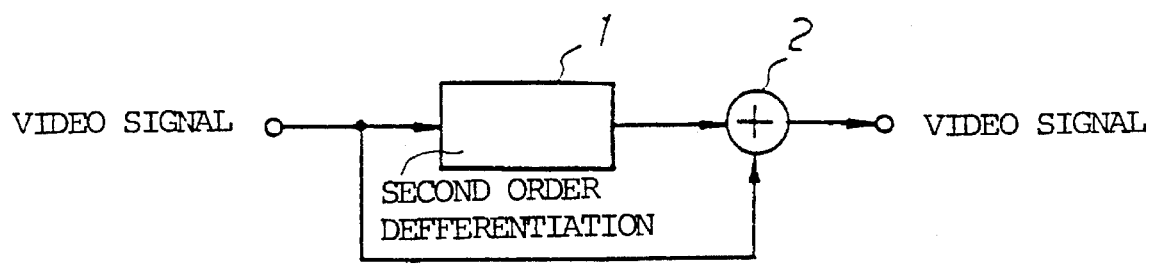
FIG. 1 is a block diagram showing an example of conventional line contour enhancing circuit.
Figure 2A:
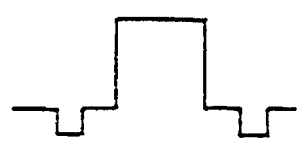
FIGS. 2A, 2B, 3A and 3B are diagrams for explaining the operation of the circuit shown in FIG. 1.

As shown in FIG. 1, a video signal, which may be a video signal demodulated in a television tuner or a video disc player, is supplied to a second order differentiation circuit 1 and to one input terminal of an adding circuit 2. The second order differentiation circuit 1 is configured to perform a second-order differentiation of the video signal in order to emphasize the rising and falling edges of the video information part of the video signal as illustrated in FIG. 2A, and produces a second-order differentiation signal. The second-order differentiation signal is supplied to the other input terminal of the adding circuit 2.

Figure 2B:
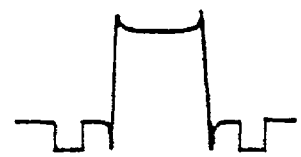

By the adding circuit 2, the second order differentiation signal is superimposed on the video signal, to derive a video signal whose amplitude is expanded towards the black and white levels at positions where the video signal rises or falls sharply, as illustrated in FIG. 2B. If this video signal is supplied to a display device through a video amplifier (both not shown), it would produce a picture in which line contours appearing in the horizontal direction are exaggerated. It is to be noted, the above explanation has been made with the assumption that there is no signal delay in the second order differentiation circuit 1.

Figure 3A:
Figure 3B:
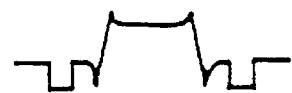

As mentioned before, if a dark scene is televised by a video camera, the S/N ratio of the video signal is generally degraded in dark portions of the image. Therefore, if the line contour enhancing process is effected to a signal having a low luminance level as illustrated in FIG. 3A, a resultant signal becomes as shown in FIG. 3B. This would increase noises in the reproduced image, to degrade picture quality.

An embodiment of the line contour enhancing circuit according to the present invention will be explained with reference to FIGS. 4 through 7B of the accompanying drawings.

Figure 4:
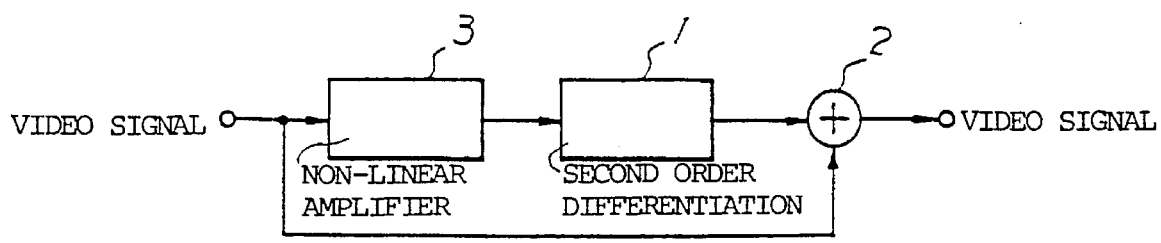
FIG. 4 is a block diagram showing an embodiment of the line contour enhancing circuit according to the present invention.

In FIG. 4, the elements and portions of the line contour enhancing circuit corresponding to those shown in FIG. 1 are designated by the same reference numerals, and the explanation thereof will not be repeated.

As shown in FIG. 4, the video signal is supplied to one input terminal of the adding circuit 2, and also to the input terminal of the second order differentiation circuit 1 via a non-linear amplifier 3.

Figure 5A:
FIGS. 5A through 7B are diagrams for explaining the operation of the circuit shown in FIG. 4.
Figure 5B:

The non-linear amplifier 3 has an amplification characteristic in which the differentiation gain increases as the level of the video signal increases. This type of characteristic can be easily obtained by using the so-called gamma (γ) correction circuit. If a video signal as illustrated in FIG. 5A whose the luminance level increases gradually is supplied to the non-linear amplifier 3, the non-linear amplifier 3 functions such that it suppresses the level of low luminance level components of the video signal and stretches high luminance level components of the video signal. Other parts of the circuit are structured in the same manner as those in the circuit shown in FIG. 1.

Now, the operation of the circuit will be explained with reference to FIGS. 6A through 7B.

Figure 6A:
Figure 6B:

Firstly, assuming that a video signal of high luminance level as illustrated in FIG. 6A is supplied to the line contour enhancing circuit, the enhancement of the line contours is effected more strongly to portions of high luminance level than to portions of low luminance level by the operation of the non-linear amplifier 3. As a result, the circuit produces a video signal in which the contrast of outlines or contours is emphasized as illustrated in FIG. 6B.

Figure 7A:
Figure 7B:

If, on the other hand, a video signal of low luminance level as illustrated in FIG. 7A is supplied to the circuit, the degree of the line contour enhancing is suppressed for low luminance level portions by the operation of the non-linear amplifier 3. As a result, the circuit produces a video signal in which the contrast in outline or contour portions is not emphasized, as illustrated in FIG. 7B.

Thus according to the present invention, a line contour enhancing circuit is obtained which can effect the line contour enhancing operation according to the luminance level of the video signal.

In the case of the embodiment described above, the gain characteristic of the non-linear amplifier is such that its differentiation gain increases gradually with respect to the luminance level of the video signal. This is, however, not limitative and a non-linear amplifier having a gain characteristic of a polygonal form can also be used. An essential point is that the amplifier has a low gain value for low level luminance signals, and the gain is increased as the level of the luminance signal increases above a certain level, or the gain is at a constant level for luminance signals above the certain level. Moreover, the non-linear amplifier can be provided in a stage after the second order differentiation circuit, and an operation of the similar sort can be obtained in that case. Furthermore, the circuit can be structured such that a non-linear circuit and an amplifier corresponding to the non-linear amplifier used in the described embodiment are provided separately.

As specifically described in the foregoing, according to the present invention the line contour enhancing circuit is configured so that the degree of the line contour enhancing is suppressed for dark portions of the video signal, and the line contour enhancing is more strongly effected for relatively light portions of the video signal. In this way, the emphasis of the outline portions of the image is made depending on the luminance level of the outline portions. Thus, the line contour enhancing operation is performed desirably in the circuit according to the present invention.

What is claimed is:

1. A line contour enhancing circuit for processing a video signal to produce an enhanced video signal, comprising:

a non-linear amplifier having a gain which varies with respect to the luminance level of said video signal in a manner such that a value of said gain at a first value of said luminance signal is greater than a value of said gain at a second value of said luminance signal, said second value of said luminance signal being a lesser magnitude in luminance level than said first value of said luminance signal, said non-linear amplifier receiving said video signal in an unaffected condition and producing an amplified video signal;

a second order differentiating circuit, coupled to receive said amplified video signal output from said non-linear amplifier for performing a second order differentiation of said amplified video signal to produce a second order differentiation signal; and an adding circuit receiving said video signal and said second order differentiation signal for superimposing said second order differentiation signal on said video signal to generate said enhanced video signal.

2. The line contour enhancing circuit as claimed in claim 1, wherein said second order differentiation circuit produces substantially no signal delay.

3. The line contour enhancing circuit as claimed in claim 1, wherein said non-linear amplifier produces said amplified video signal having a level which varies non-linearly with respect to luminance level, so that said second order differentiation signal has a level which varies non-linearly with respect to luminance level.

4. The line contour enhancing circuit as claimed in claim 3, wherein the gain of said non-linear amplifier is at a minimal value for low level luminance signal components in said video signal for luminance level components up to a predetermined luminance level, the gain increasing at luminance levels above said predetermined luminance level.

5. The line contour enhancing circuit as claimed in claim 3, wherein the gain of said non-linear amplifier is constant at a minimal value for low level luminance signal components in said video signal up to a predetermined luminance level and constant at a maximum level for luminance level components above the predetermined luminance level.

6. A line contour enhancing circuit for processing a video signal to produce an enhanced video signal, comprising:

a non-linear amplifier receiving said video signal, the non-linear amplifier having a gain that varies with respect to the luminance level of said video signal to generate an amplified video signal, the gain of said non-linear amplifier varying in a manner such that a value of said gain at a first value of said luminance signal is greater than a value of said gain at a second value of said luminance signal, said second value of said luminance signal being a lesser magnitude in luminance level than said first value of said luminance signal;

a second order differentiating circuit coupled to receive the amplified video signal output from said non-linear amplifier for performing a second order differentiation of said amplified video signal to produce a second order differentiation signal;

an adding circuit connected to the second order differentiation circuit; and a direct line feeding the video signal to said adding circuit, wherein said adding circuit superimposes said second order differentiation signal on said video signal to produce the enhanced video signal.

7. A line contour enhancing circuit as claimed in claim 6, wherein said second order differentiation circuit produces substantially no signal delay.

8. A method for processing a video signal to produce an enhanced video signal, the method comprising the steps of:

receiving a video signal to be processed, said video signal having low luminance level components and high luminance level components;

non-linearly amplifying the video signal to produce an amplified video signal in a manner such that a value of said gain at a first value of said luminance signal is greater than a value of said gain at a second value of said luminance signal, said second value of said luminance signal being a lesser magnitude in luminance level than said first value of said luminance signal;

second order differentiating the amplified video signal to produce a second order differentiation signal; and generating an enhanced video signal whose signal-to-noise ratio is enhanced in dark regions of the video signal by superimposing the second order differentiation signal on said video signal.

9. The method of claim 8, wherein the step of non-linearly amplifying further comprises the step of generating said amplified video signal having a level which varies non-linearly with respect to luminance level.

10. The method of claim 8, wherein the step of non-linearly amplifying further comprises the steps of amplifying the high luminance level components of said video signal and suppressing the low luminance level components of said video signal for emphasizing the high luminance level components of said video signal.

11. The method of claim 10, wherein said step of amplifying comprises the step of suppressing the low luminance level components of said video signal for luminance level components up to a predetermined luminance level, and amplifies the high luminance level components for luminance level components above the predetermined luminance level.

12. The method of claim 10, wherein said step of amplifying further comprises the step of suppressing the low luminance level components by a minimum constant value for luminance level components up to a predetermined luminance level, and amplifies the components the high luminance level components by a maximum constant level for luminance level components above the predetermined luminance level.

* * * * *